Figure 1:
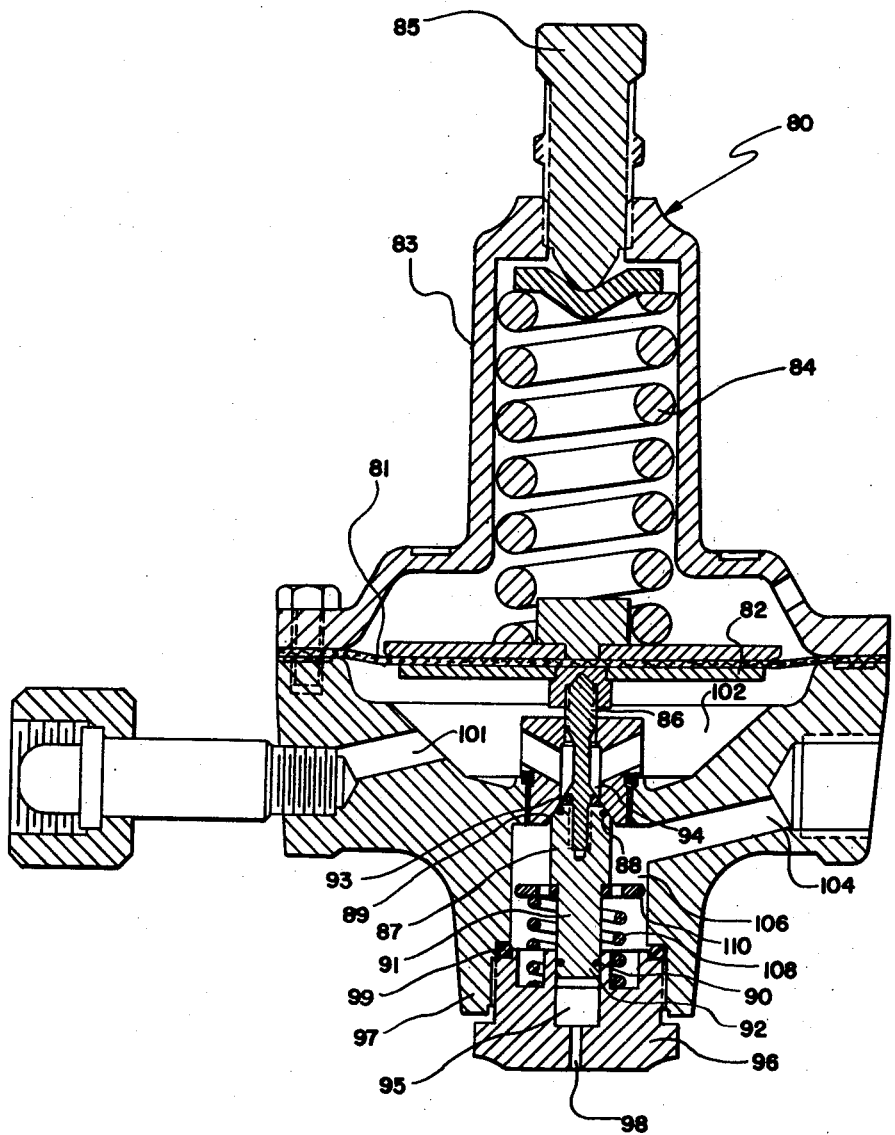

3,075,545
GAS PRESSURE REGULATOR

Francis J. Eichelman, La Grange Park, Ill., assignor to Chemetron Corporation, Chicago, Ill., a corporation of Delaware
Original application Dec. 12, 1955, Ser. No. 552,368, now Patent No. 2,985,185, dated May 23, 1961. Divided and this application July 25, 1960, Ser. No. 45,120
2 Claims. (Cl. 137—505.18)

The present invention relates to a gas pressure regulator, and more particularly to a method of and apparatus for maintaining a pre-selected gas pressure at the outlet of a stem type gas pressure regulator which is connected to a source of gas which gradually decreases in pressure.

Previous efforts to effect pressure compensation in stem type regulators consistently utilized the delivery pressure of the regulator as a standard. Delivery pressures of stem type regulators are known to vary in a particular manner as the supply source approaches depletion. The result is a varying outlet pressure because pressure compensation is dependent on a variable standard. However, the atmospheric pressure in any given location remains relatively constant (within a few millimeters of mercury), and this may be, and in the novel arrangement of this invention is, utilized as a standard pressure to aid in the maintenance of a pre-selected outlet pressure, and thus to achieve a desideratum long sought but not heretofore attained.

Accordingly, it is the principal object of this invention to provide a method of and apparatus for maintaining the gas pressure at the outlet of a stem type pressure regulator substantially constant in spite of varying pressure at the inlet of the regulator.

Another object of the present invention is to provide apparatus for regulating gas pressure which includes pressure compensating means utilizing the pressure of the atmosphere to provide a relatively constant standard.

A further object of the invention is to provide in a single stage stem type gas pressure regulator positive, easily maintained, simple, and inexpensive means to maintain the outlet pressure of the regulator substantially constant in spite of varying pressure at the inlet.

Briefly stated, and as illustrated in the accompanying drawing, there is provided a gas pressure regulator having its inlet connected to a source of gas which varies in pressure, and an outlet which is suitable for connection to gas using apparatus, for example, apparatus such as is used in welding and cutting operations or in the medical field for inhalation purposes. The regulator includes a low pressure chamber provided with a diaphragm connected to the outlet. The regulator also includes a high pressure chamber connected to the inlet with an orifice connecting the low and high pressure chambers. A valve arrangement having novel features is provided to control the orifice. The valve has a stem connecting it to the diaphragm. A spring is provided to exert pressure on the diaphragm in a direction tending to open the valve and means are provided for varying the effective pressure on the spring. The valve is provided with a sealing ring which is seated against the orifice when the valve is in its closed position. A portion of the valve is slidably mounted in a channel-like opening in a wall portion of the regulator which communicates with the atmosphere. A second sealing ring is mounted on the valve portion which slides in the channel-like opening to seal the high pressure chamber from the atmosphere. In the operation of the regulator, the gas pressure in the high pressure chamber exerts a force against the piston represented by the cross-sectional area of the first sealing ring tending to close the valve and at the same time, exerts a force against the piston represented by the cross-sectional area of the second sealing ring tending to open the valve. The base of the valve, which communicates with the atmosphere, is also subjected to a relatively constant force directed to closing the valve consisting of the pressure of the atmosphere. The cross sectional areas of the sealing ring portions of the valve are selected so that the force due to gas pressure tending to close the valve is slightly greater than that tending to open the valve. Therefore, as the pressure of the gas at the source decreases, compensation is provided for the reduced pressure within the high pressure chamber and the pressure of the atmosphere provides a substantially constant standard pressure to aid in the maintenance of a preselected outlet pressure.

The invention, both as to its organization and method of operation together with further objectives and advantages will be described in greater detail below in connection with the accompanying drawing in which FIG. 1 is a sectional view of a gas pressure regulator embodying the present invention.

In the preferred embodiment of the line regulator 80 illustrated in detail in FIG. 1, the diaphragm 81, its back-up plate 82, the bonnet 83, the diaphragm spring 84, and the adjusting screw 85 are all conventional. Below the diaphragm 81. a stem 86 is secured at one end to the diaphragm plate 82, and at its opposite end is engaged to a double piston valve 87. The double piston valve 87 is provided with oppositely disposed pistons represented by a sealing ring 88, preferably of the O type and of composition other than metal, secured in the tapered head 89 of the valve 87, and another sealing ring 90, also of composition other than metal, secured in an annular recess in the reduced cylindrical portion 91, near the base 92. The ring 88 is preferably secured in the tapered head 89 by a tapered member 93 which provides a surface interposed between the stem 86 and the tapered head 89 of the valve 87. The pressure exerted on the ring 88 by the retaining members 89 and 93 causes a part of the ring 88 to extend beyond the edges of the tapered head 89, forming a piston. A part of the ring 90 likewise extends beyond the edges of the cylindrical reduced retaining portion 91 to form a second piston. The surface areas presented by the two pistons are adapted to effect a pressure differential in the order of about one p.s.i., with the larger area being represented in the piston ring 88. This differential is significant in that it is determinative in maintaining a constant pre-selected delivery pressure from regulator 80. Obviously the dimensions may be varied for any combination of inlet and delivery pressures so long as the pressure differential remains in the same range.

The tapered head 89 of the valve 87 seats in a correspondingly tapered valve orifice 94. The ring 90 is slidable within a channel or cylinder 95 formed in a cap 96 which is threadably engaged with the body 97 of the regulator 80. The base 92 of the valve 87 is subjected to atmospheric pressure through an aperture 98 in the cap 96. The cap 96 is further provided with a sealing member 99 to prevent leakage.

An outlet 101 of the regulator 80 communicates with a low pressure chamber 102. An inlet 104 communicates with a high pressure chamber 106. A spring 108, and a perforate spring retaining plate 110 in the high pressure chamber 106 cooperate to exert a force on the double piston valve 87 sufficient to seat the tapered head 89 of the valve 87 when the regulator 80 is not in operation, closing communication between the two chambers.

When tension on the diaphragm spring 84 is increased by the inward adjustment of the screw 85, stem 86 transmits this force to valve 87, unseating it. Gas entering the high pressure chamber 106 through the inlet 104 passes through the valve orifice 94 where the pressure is reduced in relationship to the pre-selected setting of the adjusting screw 85. It then passes into the low pressure chamber 102 and issues from the outlet 101 to the delivery or consumer's line 79 at a substantially constant pressure regardless of the rate of withdrawal due to the action of the diaphragm, and regardless of a varying supply source pressure due to the compensating effect of the pistons to be described below.

As mentioned briefly earlier, stem type regulators are generally subject to an inherent shortcoming in that as the pressure of the gas source diminishes, the diaphragm is incapable of maintaining the pre-selected outlet pressure absolutely constant for any selected adjustment of the adjusting screw and the outlet pressure climbs. It should be noted that in a nozzle type regulator, the opposite effect is generally experienced. These phenomena can, of course, be avoided by utilizing a dual stage regulator which is in essence a combination of the two types mentioned and averages to a great extent these anomalies. In the present instance this averaging effect is achieved in a stem type regulator involving only a single stage, as evidenced by the fact that the regulator 80 is provided with a single valve and seat, by pressure compensation wherein atmospheric pressure is utilized as a standard.

The selected delivery pressure of the regulator 80 is maintained, regardless of diminishing inlet pressure, by counter-balancing forces acting on the double piston valve 87. The force exerted inwardly by the spring 84 due to the inward adjustment of the screw 85 tends to keep the tapered head 89 of the valve 87 unseated and at the selected position. An additional effect of the force exerted by the spring 84 is to neutralize the force exerted on the valve 87 by the spring 108 acting in cooperation with the perforate spring retaining plate 110. The piston represented by the cross sectional area of the ring 88 in the tapered head 89 of the valve 87 is subjected to a force exerted by gas in the chamber 106 tending to move the valve 87 toward the tapered valve orifice 94. The piston represented by the cross sectional area of the ring 90 in the channel or cylinder 95 is also subjected to a force exerted by the gas in the chamber 106 but tending to move the valve 87 away from the tapered valve orifice 94. As referred to generally before, the cross sectional area presented by the tapered head 89 of the valve 87 is greater than that provided by the reduced cylindrical portion 91 by a predetermined differential. Hence, the force exerted by the gas on the piston represented by the ring 88 is greater than the oppositely directed force exerted by the gas on the piston represented by the ring 90. However, the differential in areas and the resultant forces exerted thereon by the gas are so calculated that the force acting on the ring 88 is not sufficient to overcome the lesser force exerted on the ring 90 acting in cooperation with the force of the spring 84 on the diaphragm 81. Therefore, the valve 87 remains unseated, and as the inlet pressure varies there is a proportional variance in the forces exerted on the pistons represented by the ring 88 and the ring 90, thereby tending to maintain the position of the valve 87 in relation to the valve orifice 94 so that a constant preselected delivery pressure is attained.

The base 92 of the valve 87 is backed up to atmosphere which for all practical purposes exerts a constant pressure. Since this standard is utilized instead of the delivery pressure, a variable is eliminated, and the compensating counterbalancing forces tending to maintain constant the selected delivery pressure of regulator 80 are not affected by the depletion of the supply source as is the case with conventional regulators.

In the system illustrated herein, the regulator 80 is usually pre-set to delver a constant outlet pressure to the consumer's line in the neighborhood of 50 p.s.i. In utilizing atmospheric pressure as a standard, a decrease in inlet pressure down to about 70 p.s.i., has been demonstrated not to effect any substantial variance in the selected outlet pressure. The embodiment described, therefore, represents a marked advance in the art.

This application is a division of co-pending U.S. patent application Serial No. 552,368, filed December 12, 1955, now patent No. 2,985,185.

It will be understood that this invention resides in the novel combination, arrangement, and adaptation of parts, and that such modifications as will suggest themselves to those skilled in the art and which come within the spirit of this invention are included within its scope as defined by the appended claims.

I claim:

1. In a gas pressure regulator, wall means forming a low pressure chamber having outlet means and a high pressure chamber having inlet means and a cylindrical channel formed in a wall portion thereof, said channel having an aperture formed in an end portion thereof in communication with the atmosphere, means forming a tapered orifice connecting said high pressure chamber to said low pressure chamber, a diaphragm in said low pressure chamber, a first spring acting on said diaphragm against the gas pressure in said low pressure chamber, a double valve in said high pressure chamber connected to the diaphragm by a stem for controlling the movement of gas through said orifice and for closing said aperture to atmosphere, said valve having a tapered head portion adapted to seat in said orifice, and a cylindrical portion having a base opposite said head portion, said cylindrical portion being adapted for slidable mounting in said channel with said base being exposed to relatively constant atmospheric pressure through the channel aperture tending to close the valve, a second spring mounted in said high pressure chamber between said wall means and said valve urging said valve in a direction to close said orifice, a first O type sealing ring mounted on said head portion to seal between said high pressure chamber and said low pressure chamber, and a second O type sealing ring mounted on said valve about its cylindrical portion to seal between said high pressure chamber and atmosphere, the cross-sectional area of the head portion carrying said first sealing ring being slightly greater than the cross-sectional area of the cylindrical portion carrying said second sealing ring, whereby said valve is urged in a direction to close said orifice by the co-action of gas pressure in said high pressure chamber on said first sealing ring, spring pressure from said second spring, and relatively constant atmospheric pressure acting on the base of said valve, and is urged in a direction to open said orifice by the co-action of gas pressure in said high pressure chamber on said second piston ring and spring pressure from said first spring acting on said diaphragm, the force tending to close the valve due to gas pressure in said high pressure chamber being slightly greater than that tending to open the valve due to the difference in the cross-sectional areas of the portions of the valve carrying said first and second sealing rings.

2. In a gas pressure regulator as claimed in claim 1, in which the cross-sectional areas of the head and cylindrical portions carrying said first and second sealing rings are such that the surface areas presented to said high pressure chamber by said first and second sealing rings are adapted to effect a pressure differential in the order of about one p.s.i.

References Cited in the file of this patent

UNITED STATES PATENTS

| | | |
|---|---|---|
| 2,091,051 | Mesinger | Aug. 24, 1937 |
| 2,599,577 | Norgren | June 10, 1952 |
| 2,730,269 | Earle | Jan. 10, 1956 |
| 2,739,611 | Cornelius | Mar. 27, 1956 |
| 2,752,941 | Mitchell | July 3, 1956 |
| 2,788,192 | Mountford | Apr. 9, 1957 |

FOREIGN PATENTS

| | | |
|---|---|---|
| 4,578 | Germany | Mar. 12, 1880 |